US009805609B2

(12) United States Patent
Hasharoni

(10) Patent No.: US 9,805,609 B2
(45) Date of Patent: Oct. 31, 2017

(54) METHOD AND SYSTEM FOR DETERMINING A REGION OF INTEREST FOR AN IMAGING DEVICE BASED ON INSTRUMENT LANDING SYSTEM

(71) Applicant: ELBIT SYSTEMS LTD., Haifa (IL)

(72) Inventor: Omer Hasharoni, Kibbutz Yifat (IL)

(73) Assignee: ELBIT SYSTEMS LTD., Haifa (IL)

( * ) Notice: Subject to any disclaimer, the term of this patent is extended or adjusted under 35 U.S.C. 154(b) by 11 days.

(21) Appl. No.: 14/895,211

(22) PCT Filed: Jun. 2, 2014

(86) PCT No.: PCT/IL2014/050495
§ 371 (c)(1),
(2) Date: Dec. 2, 2015

(87) PCT Pub. No.: WO2014/195942
PCT Pub. Date: Dec. 11, 2014

(65) Prior Publication Data
US 2016/0125745 A1 May 5, 2016

(30) Foreign Application Priority Data

Jun. 2, 2013 (IL) .......................................... 226696

(51) Int. Cl.
*G08G 5/02* (2006.01)
*G08G 5/00* (2006.01)
(Continued)

(52) U.S. Cl.
CPC ................ *G08G 5/025* (2013.01); *G01S 5/16* (2013.01); *G01S 19/15* (2013.01); *G02B 27/01* (2013.01);
(Continued)

(58) Field of Classification Search
CPC ... G01S 19/15; G01S 1/14; G01S 5/16; G02B 2027/014; G02B 27/01; G05D 1/0676;
(Continued)

(56) References Cited

U.S. PATENT DOCUMENTS 5,677,685 A * 10/1997 Coirier ................. G05D 1/0607
244/184
5,716,032 A 2/1998 McIngvale
(Continued)

FOREIGN PATENT DOCUMENTS

| CA | 2 453 031 | 1/2003 |
| EP | 2 669 699 | 12/2013 |
| WO | WO 2009/010969 | 1/2009 |

OTHER PUBLICATIONS

International Search report of PCT Application No. PCT/IL2014/050495, dated Sep. 30, 2014.
Office Action of IL Application No. 226696, dated Jan. 8, 2014.

*Primary Examiner* — Anner N Holder
(74) *Attorney, Agent, or Firm* — Pearl Cohen Zedek Latzer Baratz LLP

(57) ABSTRACT

A system for determining a region of interest for an imaging device based on instrument landing system (ILS) is provided herein. The system may include an imaging device attached to an aircraft; an ILS detector; a computer processor configured in to calculate in a line of sight between said aircraft and a planned touch down point, based on the received ILS signals; a touchdown positioning module executed by the computer processor and configured to calculate a position in a field of view (FOV) of said imaging device which represents the planned touchdown point, based on said line of sight; and a region of interest (ROI) module executed by the computer processor and configured to define a region of interest (ROI) of the imaging device based on said position in said FOV, wherein said computer processor is further
(Continued)

configured to apply an image processing operation only to data within said ROI.

20 Claims, 3 Drawing Sheets

(51) Int. Cl.
| | | |
|---|---|---|
| *G02B 27/01* | (2006.01) | |
| *G01S 19/15* | (2010.01) | |
| *G01S 5/16* | (2006.01) | |
| *G01S 1/14* | (2006.01) | |
| *G05D 1/06* | (2006.01) | |
| *H04N 7/18* | (2006.01) | |
| *G06T 7/77* | (2017.01) | |
| *G06T 7/11* | (2017.01) | |

(52) U.S. Cl.
CPC .............. *G05D 1/0676* (2013.01); *G06T 7/11* (2017.01); *G06T 7/77* (2017.01); *G08G 5/0021* (2013.01); *H04N 7/185* (2013.01); *G01S 1/14* (2013.01); *G02B 2027/014* (2013.01)

(58) Field of Classification Search
CPC ...... G08G 5/0021; G08G 5/025; H04N 7/185; G06T 7/0048; G06T 7/0081; G06T 7/11; G06T 7/77
See application file for complete search history.

(56) References Cited

U.S. PATENT DOCUMENTS

| | | | |
|---|---|---|---|
| 6,064,398 A * | 5/2000 | Ellenby | G01C 17/34 345/633 |
| 6,067,484 A | 5/2000 | Rowson et al. | |
| 7,089,092 B1 * | 8/2006 | Wood | G01S 19/15 342/33 |
| 8,462,019 B1 * | 6/2013 | VanDerKamp | G01C 23/005 340/426.22 |
| 9,129,521 B2 * | 9/2015 | Gannon | G08G 5/0047 |
| 9,159,241 B1 * | 10/2015 | Murphy | G08G 5/02 |
| 9,253,453 B2 * | 2/2016 | Meidan | G08B 13/1965 |
| 9,260,180 B2 * | 2/2016 | Puyou | G05D 1/0676 |
| 2002/0004692 A1 | 1/2002 | Nicosia et al. | |
| 2004/0026573 A1 | 2/2004 | Andersson et al. | |
| 2004/0133341 A1 * | 7/2004 | Spriggs | G08G 5/0013 701/435 |
| 2005/0007386 A1 * | 1/2005 | Berson | G01C 23/00 345/633 |
| 2008/0180351 A1 * | 7/2008 | He | G01C 23/00 345/1.1 |
| 2009/0289957 A1 | 11/2009 | Sroka et al. | |
| 2010/0253546 A1 * | 10/2010 | Ibrahim | G08G 5/0008 340/961 |
| 2011/0142281 A1 * | 6/2011 | He | G01C 23/00 382/103 |
| 2013/0046462 A1 * | 2/2013 | Feyereisen | G08G 5/025 701/457 |
| 2013/0229505 A1 * | 9/2013 | Konno | A61B 1/04 348/68 |
| 2013/0321201 A1 * | 12/2013 | Savoy | G01S 19/15 342/357.3 |

\* cited by examiner

METHOD AND SYSTEM FOR DETERMINING A REGION OF INTEREST FOR AN IMAGING DEVICE BASED ON INSTRUMENT LANDING SYSTEM

CROSS-REFERENCE TO RELATED APPLICATIONS

This application is a National Phase Application of PCT International Application No. PCT/IL2014/050495, International Filing Date Jun. 2, 2014, entitled: "METHOD AND SYSTEM FOR DETERMINING A REGION OF INTEREST FOR AN IMAGING DEVICE BASED ON INSTRUMENT LANDING SYSTEM", published on Dec. 11, 2014 as International Patent Application Publication No. WO 2014/195942, claiming priority of Israel Patent Application No. 226696, filed Jun. 2, 2013, which is incorporated herein by reference in its entirety.

FIELD OF THE INVENTION

The present invention relates generally to the field of electronic landing systems and in particular to systems and methods for improving image acquisition of an imaging device that is usable in aircraft landing.

BACKGROUND OF THE INVENTION

Instrument landing systems are used in many runways to facilitate the landing process by providing radio frequency (RF) beams indicating the runway location as well as preferred touchdown points along it. Aircrafts equipped with ILS facilities may easily align toward landing with the optimal landing angle at the correct time.

Enhance vision systems (EVS) are used to provide the pilots with a better visual display of the landing route and specifically the runway and its immediate environment. Sometimes, augmented reality such as visual symbol indicated is presented over a portion of the image presented to the pilot. It is desirable that the portion of the image presented to the pilot would be restricted only to the relevant portion of the scene, being the runway, its immediate environment and the planned touchdown point on the runway. This is due the high level of computer resources that is required for the enhance vision operation.

Currently, limiting the image enhancement is carried out by determining the planned touchdown position based on global positioning systems (GPS) and other location based orientation means. GPS service is not always available and may sometimes lead to limited performance. It is therefore desirable to have a substitute mechanism to determine the region of interest (ROI) for enhanced vision for imaging devices used in the course of a landing process.

SUMMARY OF THE INVENTION

Embodiments of the present invention provide a system for determining a region of interest for an imaging device based on instrument landing system (ILS). The system may include an imaging device attached to an aircraft; an ILS detector configured to detect a presence of an ILS; a computer processor configured to calculate a line of sight between said aircraft and a planned touch down point, based on the received ILS signals; a touchdown positioning module executed by the computer processor and configured to calculate a position in a field of view (FOV) of said imaging device which represents the planned touchdown point, based on said line of sight; and a region of interest (ROI) module executed by the computer processor and configured to define a region of interest (ROI) of the imaging device based on said position in said FOV, wherein said computer processor is further configured to apply an image processing operation only to data within said ROI.

These additional, and/or other aspects and/or advantages of the present invention are set forth in the detailed description which follows.

BRIEF DESCRIPTION OF THE DRAWINGS

For a better understanding of the invention and in order to show how it may be implemented, references are made, purely by way of example, to the accompanying drawings in which like numerals designate corresponding elements or sections. In the accompanying drawings.

Figure 1:
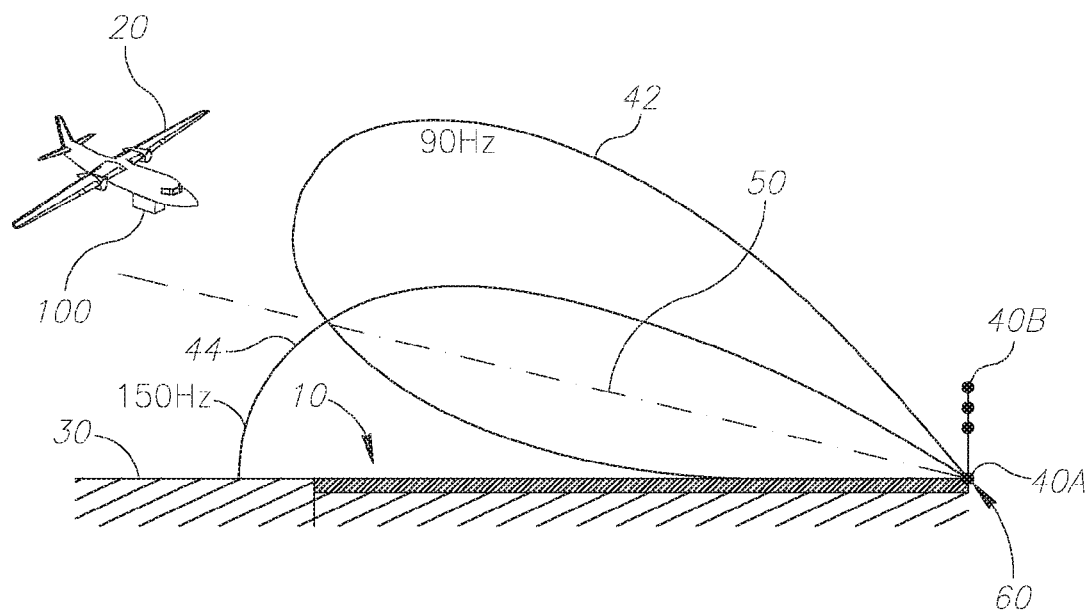
FIG. 1 illustrates the environment according to an aspect of the present invention.

The drawings together with the following detailed description make the embodiments of the invention apparent to those skilled in the art.

DETAILED DESCRIPTION OF THE INVENTION

With specific reference now to the drawings in detail, it is stressed that the particulars shown are for the purpose of example and solely for discussing the preferred embodiments of the present invention, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings makes apparent to those skilled in the art how the several forms of the invention may be embodied in practice.

Before explaining the embodiments of the invention in detail, it is to be understood that the invention is not limited in its application to the details of construction and the arrangement of the components set forth in the following descriptions or illustrated in the drawings. The invention is applicable to other embodiments and may be practiced or carried out in various ways. Also, it is to be understood that the phraseology and terminology employed herein is for the purpose of description and should not be regarded as limiting.

FIG. 1 illustrates an aircraft 20 approaching landing over a runway 10 on the ground 30. Runway 20 equipped with instrument landing system (ILS) which may comprise a first antenna 40A and a second antenna 40B each transmitting a respective radio frequency (RF) beam 44 and 42 respectively each having a different frequency (e.g., 150 Hz and 90 hz respectively). The ILS may be located at various locations along runway 20 and possibly at planned touchdown point 60. Aircraft 20 which may be equipped with ILS detection device may analyze beams 40A and 40B and determine a planned landing route 50 based on a predefined ration between beams signals.

According to some embodiments of the present invention, aircraft 20 is equipped with a system 100 for determining a region of interest for an imaging device based on ILS. System 100 which includes an imaging device, utilize the ILS guidance in order to effectively limit an enhanced image processing to a region of interest within the images captured by the imaging device as will be details hereinafter.

Figure 2:
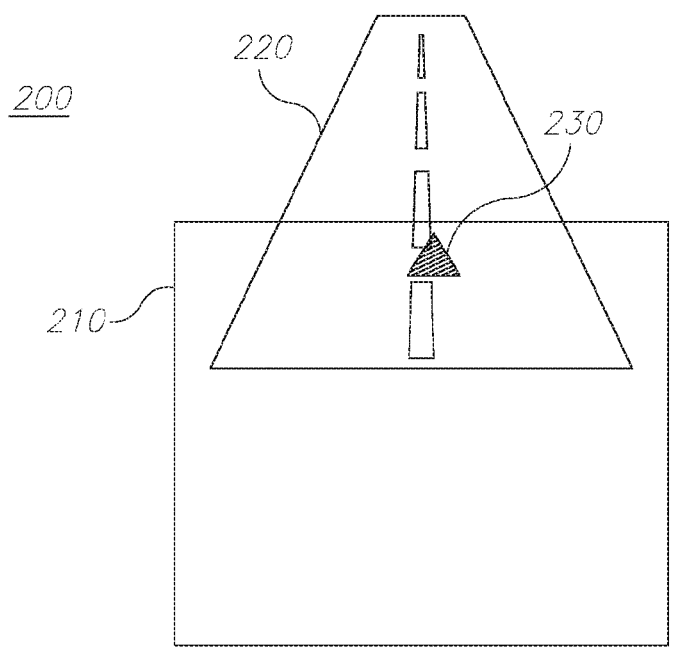
FIG. 2 illustrates an aspect according to some embodiments of the present invention.

FIG. 2 illustrates an entire image 200 captured by the imaging device at a given point of time during the landing process. Within image 200 runway 220 may be see with planned touchdown point 230 clearly indicated. It is the object of embodiments of the present invention to enable the locating of touchdown point 230 over entire image 200 in terms of the pixels that represent it. By doing so predefined image processing algorithms, such as algorithms usable for image enhancement, may be applied only to a region of interest (ROI) 210 being a subset of entire image 200 which contains planned touchdown point.

Figure 3:
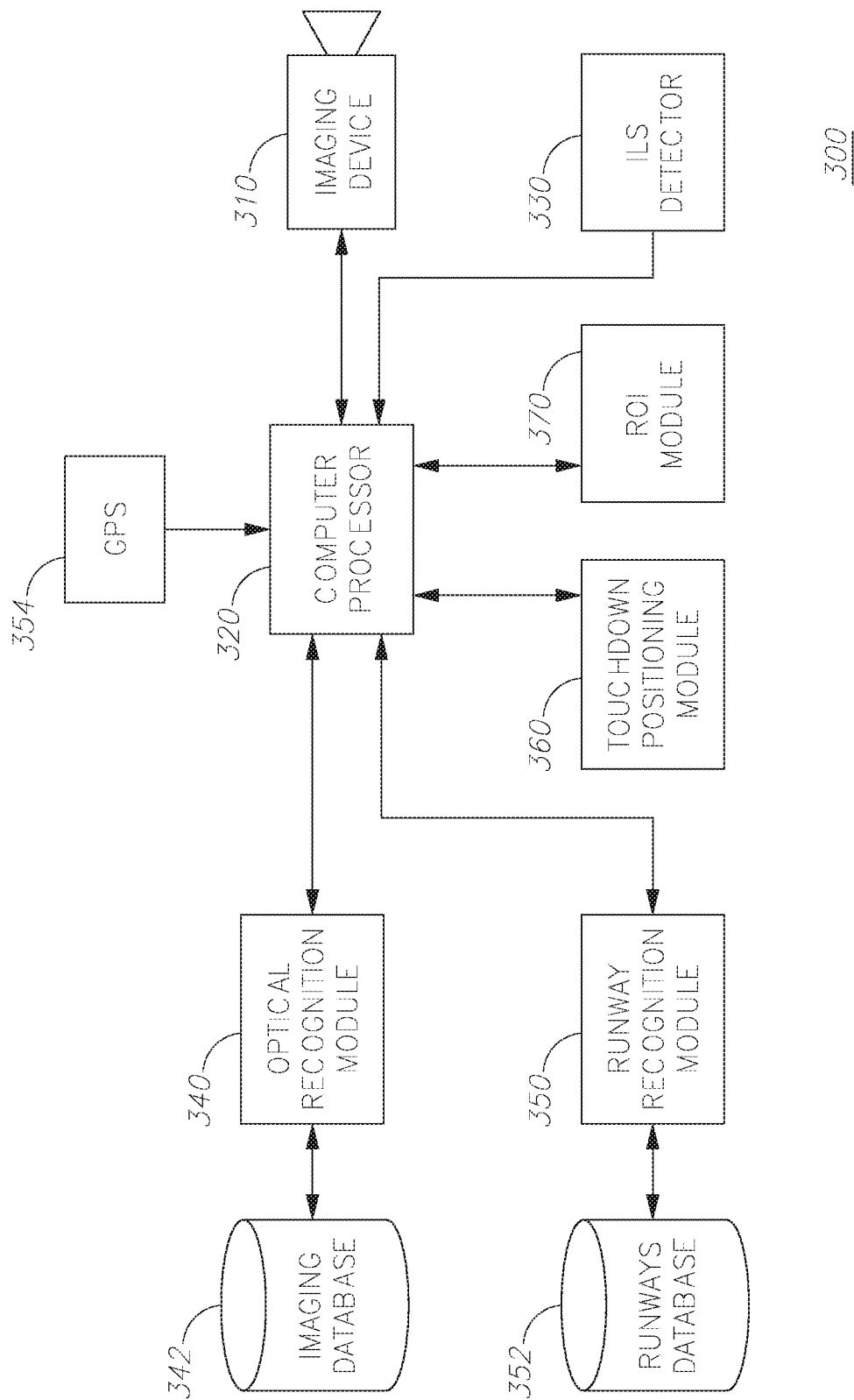
FIG. 3 is a block diagram illustrating a system according to some embodiments of the present invention.

FIG. 3 shows a system 300 for determining a region of interest for an imaging device based on instrument landing system (ILS). System 300 may include an imaging device 310 attached to an aircraft (not shown here). System 300 may further include an ILS detector 330 configured to detect a presence of an ILS and a computer processor 320 configured to calculate a line of sight between said aircraft and a planned touch down point, based on the received ILS signals. System 300 may further include a touchdown positioning module 360 executed by computer processor 320 and configured to calculate a position in a field of view (FOV) of imaging device 310 which represents the planned touchdown point, based on said line of sight. System 300 may further include a region of interest (ROI) module 370 executed by computer processor 320 and configured to define a region of interest (ROI) of imaging device 320 based on said position in said FOV, wherein computer processor 320 is further configured to apply an image processing operation only to data within said ROI.

According to some embodiments of the present invention, the ILS is located near a runway and wherein the calculating a line of sight is further based on said runway parameters.

According to some embodiments of the present invention, system 300 may further include a runway recognition module 350 executed by computer processor 320, and a runways database 352 wherein in a case that ILS are not detected, runway recognition module 350 is configured to calculate a line of sight between the aircraft and a planned touch down point, based on aircraft position and runway parameters. The database may include a global database of runways in the world which is readily available in the aviation industry.

According to some embodiments of the present invention, system 300 may further include a global positioning system (GPS) 354 wherein the aircraft position is obtained via the GPS and wherein the runway parameters are obtained from a global runways database 352 using the processor 320.

According to some embodiments of the present invention, system 300 may further include an optical recognition module 340 executed by computer processor 320 and an imaging database 342, wherein the aircraft position and the runway parameters are obtained via optical recognition of aerial images of the runways and key points located near the runway captured by the imaging device. Imaging database 342 may contain images of runways and or visual indicators such as known building which serve as orientation points.

According to some embodiments of the present invention, the calculation of a position in a field of view (FOV) is further based on aircraft altitude.

According to some embodiments of the present invention, the imaging device is an Enhanced Vision System (EVS) and the enhanced vision which include presenting symbols and visual indicator to the pilot is only applied to the ROI for effective usage of computational resources.

According to some embodiments of the present invention, the ROI is a window of approximately 17.5 degree by 13.25 degree of FOV, centered substantially around the ROI center.

According to some embodiments of the present invention, whenever ILS are not detected, the aircraft position is derived via GPS readings.

According to some embodiments of the present invention, whenever ILS are detected, the ILS signals are interpreted based on runway details, to yield the planned touchdown point.

According to some embodiments of the present invention, the position of the touchdown point over the captured image is derived by a combination of ILS, GPS and optical recognition as described separately above. Advantageously, the combined calculation of the position provides a more reliable validated value.

Figure 4:
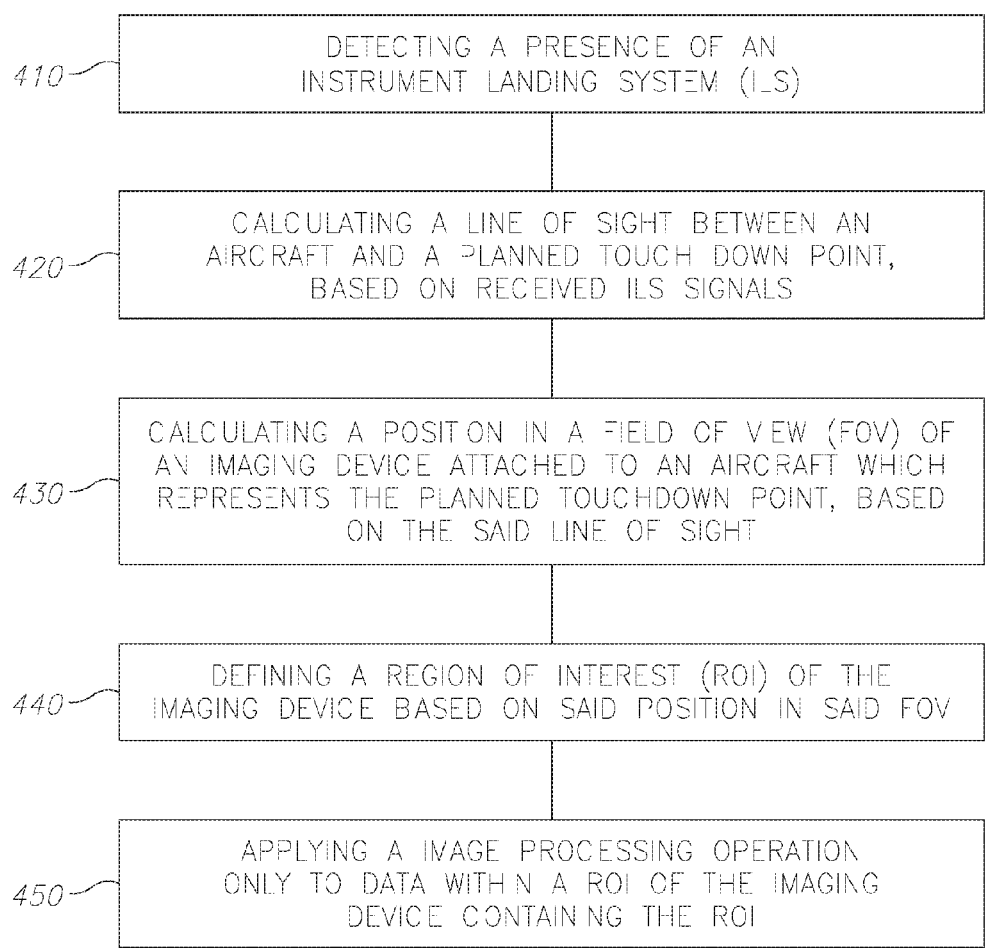
FIG. 4 is a high level flowchart illustrating a method according to some embodiments of the present invention.

FIG. 4 is a high level flowchart illustrating a method 400 according to some embodiments of the present invention. It is understood that method 400 may not necessarily be implemented by the aforementioned architecture of system 300 comprising: Method 400 may include the following steps: detecting a presence of an Instrument Landing System (ILS) 410; calculating a line of sight between an aircraft and a planned touch down point, based on received ILS signals 420; calculating a position in a field of view (FOV) of an imaging device attached to an aircraft which represents the planned touchdown point, based on the said line of sight 430; defining a region of interest (ROI) of the imaging device based on said position in said FOV 440; and applying an image processing operation only to data within the ROI 450.

According to some embodiments of the present invention, in a case that ILS are not detected, method 400 further include a step of calculating a line of sight between the aircraft and a planned touch down point, based on aircraft position and runway parameters. In some embodiments, the aircraft position may be obtained via global positioning system (GPS) and wherein the runway parameters are obtained from a global runways database.

Alternatively, the aircraft position and the runway parameters are obtained via optical recognition of aerial images of the runways and key points located near the runway.

According to some embodiments of the present invention, the specified operation applied to the captured images within the ROI may include image processing operations such as those used in EVS and provide augmentation to the scene of the landing process as seen by the pilot.

As will be appreciated by one skilled in the art, aspects of the present invention may be embodied as a system, method or an apparatus. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system."

In various embodiments, computational modules may be implemented by e.g., processors (e.g., a general purpose computer processor or central processing unit executing software), or digital signal processors (DSPs), or other circuitry. The baseband modem may be implanted, for example, as a DSP. A beamforming matrix can be calculated and implemented for example by software running on general purpose processor. Beamformers, gain controllers, switches, combiners, and phase shifters may be implemented, for example using RF circuitries.

The flowchart and block diagrams herein illustrate the architecture, functionality, and operation of possible implementations of systems and methods according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment", "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention.

The invention claimed is:

1. A method comprising:
    detecting a beacon of an Instrument Landing System (ILS) based Radio Frequency (RF) signals while approaching landing on a runway;
    calculating a line of sight between an aircraft and a planned touch down point along said runway, based on received ILS signals associated with the detected beacon;
    calculating a position which represents the planned touchdown point, in a field of view (FOV) of an imaging device attached to said aircraft, based on said line of sight;
    defining a region of interest (ROI) within the FOV of the imaging device based on said position; and
    performing an image enhancement only to data within the ROI by applying image processing algorithms.

2. The method according to claim 1, wherein the ILS is located near a runway and wherein the calculating a line of sight is further based on said runway parameters.

3. The method according to claim 1, wherein in a case that ILS signals are not detected, the method further comprises calculating a line of sight between the aircraft and a planned touch down point, based on aircraft position and runway parameters.

4. The method according to claim 3, wherein the aircraft position is obtained via global positioning system (GPS) and wherein the runway parameters are obtained from a global runways database.

5. The method according to claim 3, wherein the aircraft position and the runway parameters are obtained via optical recognition of aerial images of the runways and key points located near the runway.

6. The method according to claim 1, wherein said calculating a position in a field of view (FOV) is further based on aircraft altitude.

7. The method according to claim 1, wherein the imaging device is an Enhanced Vision System (EVS).

8. The method according to claim 1, wherein the ROI is a window of approximately 17.5 degree by 13.25 degree of FOV, centered substantially around the ROI center.

9. The method according to claim 1, wherein, whenever ILS are not detected, the aircraft position is derived via GPS readings.

10. The method according to claim 1, wherein, whenever ILS are detected, the ILS signals are interpreted based on runway details, to yield the planned touchdown point.

11. The method according to claim 1, wherein, the specified operation comprises image processing operations.

12. A system comprising:
- an imaging device attached to an aircraft;
- an Instrument Landing System (ILS) based Radio Frequency (RF) detector configured to detect a presence of an ILS;
- a computer processor configured to calculate a line of sight between said aircraft and a planned touch down point, based on the received ILS signals;
- a touchdown positioning module executed by the computer processor and configured to calculate a position in a field of view (FOV) of said imaging device which represents the planned touchdown point, based on said line of sight; and
- a region of interest (ROI) module executed by the computer processor and configured to define a region of interest (ROI) of the imaging device based on said position in said FOV,
- wherein said computer processor is further configured to perform an image enhancement only to data within said ROI by applying image processing algorithms.

13. The system according to claim 12, wherein the ILS is located near a runway and wherein the calculating a line of sight is further based on said runway parameters.

14. The system according to claim 12, further comprising a runway recognition module executed by the computer processor, and a runways database wherein in a case that ILS are not detected, the runway recognition module is configured to calculate a line of sight between the aircraft and a planned touch down point, based on aircraft position and runway parameters.

15. The system according to claim 14, further comprising global positioning system (GPS) wherein the aircraft position is obtained via the GPS and wherein the runway parameters are obtained from a global runways database.

16. The system according to claim 14, further comprising an optical recognition module executed by the computer processor and an imaging database, wherein the aircraft position and the runway parameters are obtained via optical recognition of aerial images of the runways and key points located near the runway captured by the imaging device.

17. The system according to claim 12, wherein said calculating a position in a field of view (FOV) is further based on aircraft altitude.

18. The system according to claim 12, wherein the imaging device is an Enhanced Vision System (EVS).

19. The system according to claim 12, wherein the ROI is a window of approximately 17.5 degree by 13.25 degree of FOV, centered substantially around the ROI center.

20. The system according to claim 12, wherein, whenever ILS are not detected, the aircraft position is derived via GPS readings.

* * * * *